Figure 1:
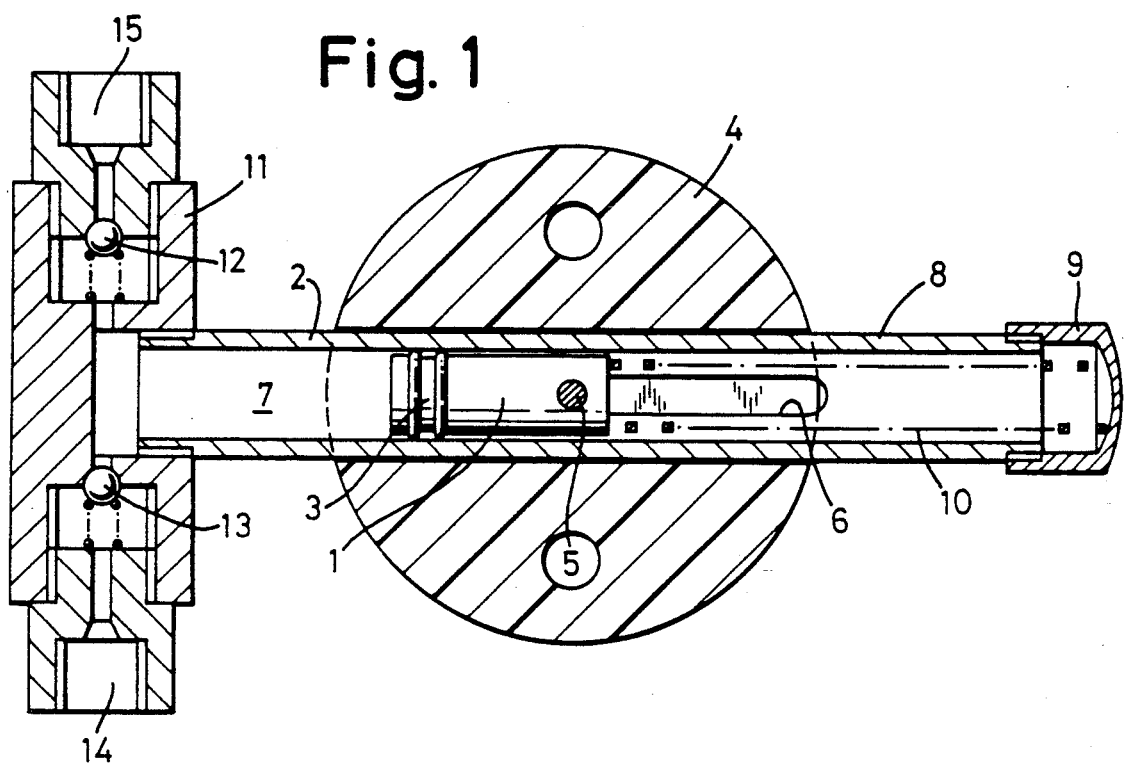

United States Patent [19]

Bignall

[11] Patent Number: 5,080,196
[45] Date of Patent: Jan. 14, 1992

[54] LUBRICATING SYSTEM AND PUMP

[75] Inventor: John R. Bignall, Haughton Green, United Kingdom

[73] Assignee: Masterlube System Limited, Darlington, United Kingdom

[21] Appl. No.: 592,920

[22] Filed: Oct. 4, 1990

[30] Foreign Application Priority Data

Oct. 5, 1989 [GB] United Kingdom ............... 8922476

[51] Int. Cl.⁵ .......................................... F16N 13/22
[52] U.S. Cl. ................................ 184/15.1; 184/27.4; 417/460
[58] Field of Search ............... 184/15.1, 27.4, 27.1, 184/38.1–38.4, 45.1, 45.2; 417/460, 568

[56] References Cited

U.S. PATENT DOCUMENTS

| 2,028,098 | 1/1936 | Zafuta | 417/460 |
| 2,294,673 | 9/1942 | Prete | 184/45.1 |
| 2,686,476 | 8/1954 | Klein | 184/27.1 |
| 3,635,597 | 1/1972 | Marten | 417/568 |

Primary Examiner—Stephen F. Husar
Assistant Examiner—Alan B. Cariaso
Attorney, Agent, or Firm—Nixon & Vanderhye

[57] ABSTRACT

A pump has a static piston (1) slidably received in a movable cylinder (2). The piston (1) is anchored to a body (4) and the cylinder (2) slides in the body (4). A displacement force applied to an end cap (9) of the cylinder (2) will displace the cylinder in one direction and a return spring (10) returns the cylinder in the opposite direction. A non-return valve assembly (11) enables material to be drawn into and pumped from portion (7) of the cylinder (2). A pin (5), passing through slots (6) in the cylinder (2), secures piston (1) to the body (4).

7 Claims, 2 Drawing Sheets

LUBRICATING SYSTEM AND PUMP

This invention relates to a lubricating system which uses a pump of the kind in which a static piston is slidably received within a movable cylinder.

One object of the invention is to provide a pump of simple construction and which is therefore inexpensive to manufacture and reliable in use. A pump according to the invention may be used, for example, for pumping medium viscosity oil. Such a pump could be used on agricultural machinery, such as a baler, which provides a regular oscillatory displacement force for operating the pump.

Another object of the invention is to provide a lubricating system having a simple but reliable pump, the system also being self-adaptive in governing its own pressure of lubricating fluid.

According to one aspect of the invention, a pump comprises a static piston slidably received within a movable cylinder, a first non-return valve which provides an inlet to the cylinder, and biasing means located in the cylinder for returning the cylinder to a starting position, the piston being anchored to a body which slidably supports the cylinder, the cylinder having a portion which projects from the body to enable a displacement force to be applied to the cylinder to obtain a pumping action, characterised in that the cylinder extends longitudinally from each side of the piston so as to define a chamber portion on one side of the piston and the end portion which projects from the body; said first non-return valve and a second non-return valve, which provides an outlet from the cylinder, communicating with said chamber portion, whereby the pressure exerted in said chamber portion, due to said pumping action, urges the cylinder in a direction opposite to the direction in which the biasing means urges the cylinder.

In a preferred embodiment, the piston is statically anchored to the body by a retaining member, such as a pin, which passes through slots in the cylinder and is fixed to the body.

Preferably, the biasing means is a spring which is located between the other side of the piston and the remote end of the cylinder.

According to another aspect of the invention, a lubricating system comprises the above mentioned pump and it further includes tubular means connected to said second non-return valve, which tubular means are provided to supply lubricating fluid to one or more bearings or chains in a machine connected to the system, and restricting means having a predetermined fluidic resistance, which restricting means are provided to restrict the supply of the lubricating fluid to the respective bearings or chains, the arrangement being such that the force exerted by the biasing means on the cylinder is less than a predetermined maximum fluidic pressure in the chamber portion of the cylinder whereby the cylinder is retained in at least a partially displaced position so that its projecting end portion is spaced from the displacement force over part of the normal stroke of the cylinder.

Figure 2:
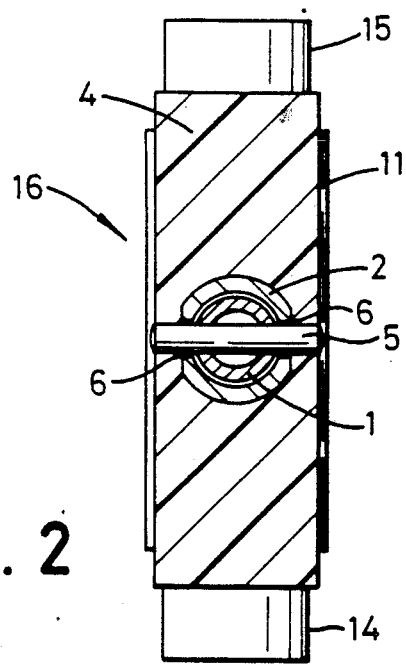
Figure 3:
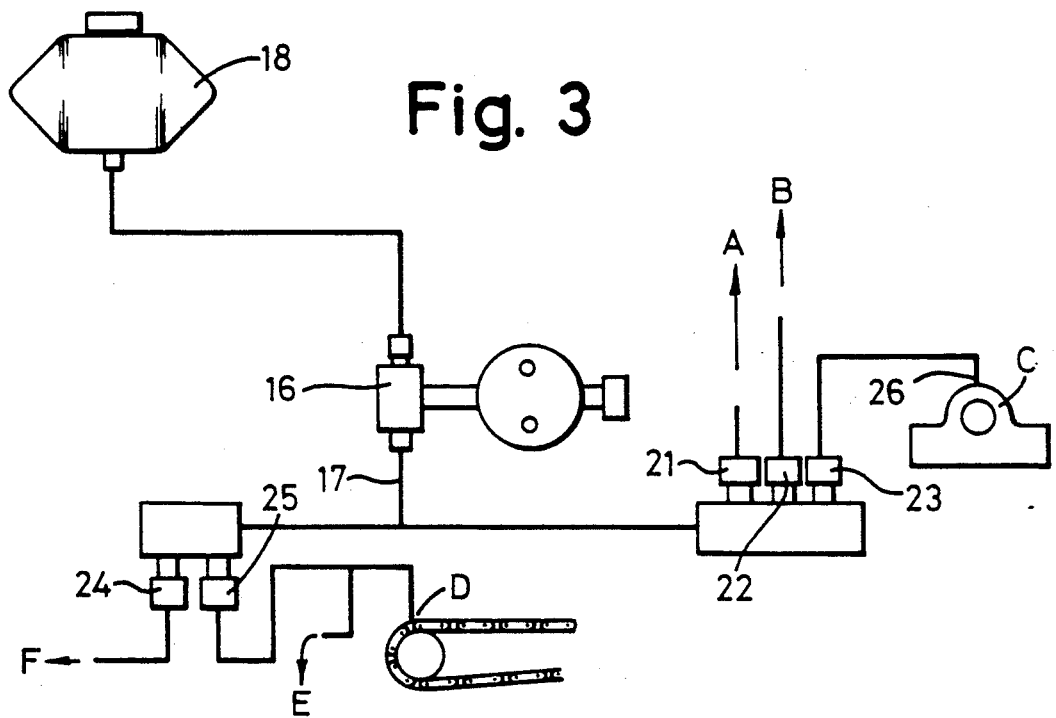
Figure 4:
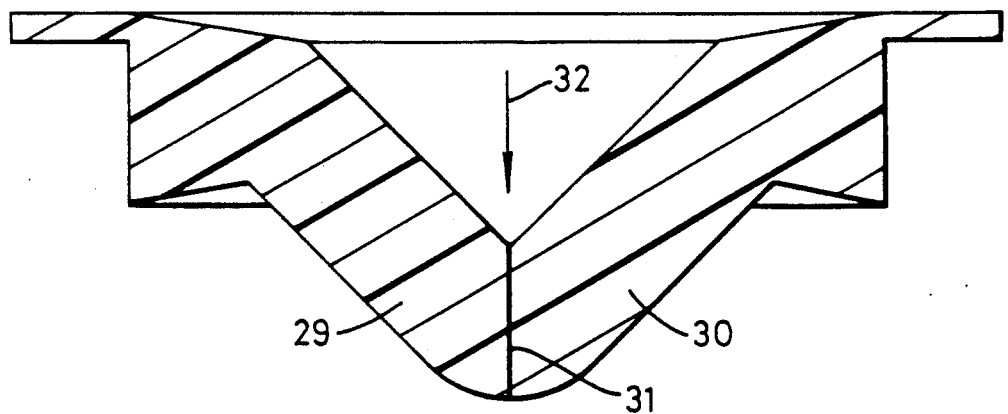

A preferred embodiment of the invention will now be described with reference to the accompanying Drawings in which:

FIG. 1 is a side elevation, in section, of a pump,
FIG. 2 is an end-on view of the pump shown in FIG. 1.
FIG. 3 is a schematic view of a lubricating system according to the invention, and
FIG. 4 schematically illustrates a preferred non-return valve.

Referring to the Drawings, a pump comprises a piston 1, which may be made of steel, slidably received in a cylinder 2, which may be made of brass. A doubled cup seal 3 mounted on the piston 1 seals the piston to the cylinder whilst enabling the cylinder to move relative thereto. The piston is anchored to a body 4 by means of a retaining roll pin 5. The body 4 is preferably made of Nylon 66 since this enables the cylinder 2 to be firmly supported whilst enabling relatively free slidable movement. Slots 6 in the side of cylinder 2 accommodate pin 5 during reciprocal movement. Since the seal 3 seals the chamber portion 7, the slots 6 do not leak.

An end portion 8 of cylinder 2 projects outwardly from the body 4 and terminates in a screw cap 9. A return spring 10 is located within the cylinder 2, i.e. between one end of the piston 1 and the inner end wall of the cap 9.

A chamber portion 7 of cylinder 2 projects from the body 4 and has a screw thread on which is mounted a non-return valve assembly 11. Assembly 11 is therefore supported by the cylinder 2 and moves bodily with it. Assembly 11 contains spring-loaded non-return ball valves 12, 13 of known construction which respectively communicate with an outlet port 14 and an inlet port 15. Thus, as cylinder 2 moves relative to piston 1 a charge of material is sucked into portion 7 from the inlet 15 and is discharged through the outlet 14.

A reciprocating displacement force is applied to the end cap 8 in order to displace cylinder 2 regularly to the left-hand side of the Drawing. Spring 10 is provided for returning cylinder 2 to its starting position after the displacement force has been removed. This return of the cylinder is delayed as explained below.

The preferred embodiment of the invention provides a simple single piston pump suitable for pumping medium viscosity oil. It governs its own pressure, e.g. to a maximum of 120 psi. The quantity of oil transported depends on the length of stroke, e.g. up to a maximum of 1.5 cc. The pump is designed with a minimum of parts to provide low cost manufacture and reliability of operation. This is due, in particular, to the use of a static piston anchored within a body in which the cylinder is free to move. Stroke adjustments can easily be made by positioning the body 4 either further or nearer to the means for providing a displacement force on cap 9.

FIG. 3 is a schematic view of a lubricating system including the pump 16 illustrated in FIGS. 1 and 2. The pump 16 is connected to tubular means 17 which are provided for supplying lubricating fluid from a reservoir 18 to bearings A, B, C (only one shown in the Drawings) and chains D, E, F within a machine (not shown) which requires continuous lubrication. Restrictors 21-25 each have an orifice of a predetermined size, or are adjustable so as to provide orifices of required sizes. These restrictors are located in the tubular system and connected to respective lubricating fluid inlets 26 for the bearings of the machine. The sizes of the orifices, i.e. the fluid resistance offered by each of the restrictors is selected with regard to the amount of lubricating fluid required by the bearings. Some bearings will be larger than others and/or subject to greater stresses and these bearings will require more lubricating fluid (oil) than others. Also, in view of the very small bore of the piping used in the tubular system 17, bearings which are more remote from the pump 16 may require to be connected to restrictors which offer less resistance than restrictors which are closer to pump 16. Whilst restrictors having orifices of a fixed size can be used, it would also be possible to use adjustable restrictors which can be adjusted so as to provide the required fluid resistance in order to balance or "tune" the lubricating system.

The lubricating system, including the pump 16 is designed to suit a particular machine and its lubricating requirements. For example, the pump 16 may deliver 1.0 cc of oil each time the cap 9 is moved by the displacement force towards the body 4. Assuming that the total lubricating requirements of machine 20 are 10 cc per 24 hours, the cap 9 may be displaced 10 times during the course of a day. The rate of displacement can be increased by reducing the stroke length of the cylinder 2 simply by moving the body 4 further away from the displacement force. The body 4 may be slidably mounted and clamped in position by suitable means (not shown) to enable the stroke length to be adjusted. Thus, if the stroke lengths were adjusted so that the pump delivered 0.5 cc for each displacement of cap 9, the displacement rate would be 20 strokes per day.

Whilst this delivery rate is desirable, there will be a build-up in the pressure of the lubricating fluid in the tubular system 17 after the system has been fully primed and is operating normally. This is due to the fact that the restrictors 21-24 and the clearance between the surfaces of the bearings A-D offer such a fluidic resistance that only minute quantities of oil can escape onto the bearings whilst pressure is exerted on the supply side of the pump 16 and non-return valve 13. This would normally cause a high back pressure to build up if a pump were used which was subject to direct displacement in both directions of reciprocal movement. This would be the case, for example, with a pump in which a piston was forced in one direction and then forced in the opposite direction. This is similar to an automotive engine where the piston is connected, by a crank rod, to a rotating crank. If such a piston and cylinder arrangement were used in the lubricating system of FIG. 3, there is a danger that a rupture would occur due to the high back pressure, i.e. where the oil could not escape from the bearings fast enough. However, this situation could not arise with the pump and lubricating system of the invention because it is self-adaptive in governing its own pressure of lubricating fluid. This will be explained in more detail below.

When the system of FIG. 3 is under pressure, non-return valve 13 is open due to the pressure exerted by the displacement of cylinder 2. This pressure continues to rise whilst the cylinder 2 is positively displaced by the driving force. When the driving force is removed, the spring 10 will exert a returning force on the cylinder 2. However, if the pressure within the chamber portion 7 of the pump 16 is still high, this pressure will exceed the return bias of spring 10 as well as maintaining the return valve 13 in its open position. Therefore, the cylinder 2 will not be returned to its starting position by the spring 10. The effect of this is to hold the remote end or cap 9 of cylinder 2 away from the displacement force (e.g. a rotating cam, not shown) and hence the cylinder 2 will not be driven. However, as the pressure within the chamber 7 decreases, due to the escape of oil at the bearings A-D, the spring 10 will gradually cause the cylinder to extend more and more from the body 4, whereby the cylinder 2 will be driven over a fraction of its stroke due to the displacement force. The pump 16 thereby adapts itself to the required pressure in the lubricating system and this avoids the above mentioned problem of a dangerous increase in back pressure.

In designing the system, the compression strength of spring 10 and of the means biasing non-return valve 13 are taken into account along with the amount of fluid displaced by the pump. The sizes of the restrictors 21-24 and the bore of the tubular system are also factors which require consideration. However, it can be stated that the maximum pressure within chamber 7 just exceeds the pressure exerted by spring 10 in most cases where the preferred embodiment of the invention is used. Generally speaking, calculations are made to determine the required dimensions and final adjustments are made by trial and error.

Whilst FIG. 1 illustrates conventional spring biased ball non-return valves, it is preferred to use the type of non-return valve which comprises two or more cusps which close together and which are forced apart by pressure on the supply side. A similar valve is found in the human heart. Such valves are herein referred to as cusp valves. A suitable cusp valve is shown schematically in FIG. 4. It is made of resilient plastics material and has the shape of a beak with confronting cusps 29, 30 divided by a slit 31. Pressure exerted in the direction of the arrow 32 forces the cusps open and they close due to the natural resilience of the material and the shape in which they are moulded. The valve is mounted in a suitable supporting structure (not shown for greater clarity) which supplies lubricating fluid to the underside of the valve and which conducts the fluid to the pipe 17.

Diaphragm valves could also be used to provide the same effect.

Whilst an embodiment of the invention has been described by way of an example, modifications and changes are possible with the scope of the invention.

What is claimed:

1. A pump comprising:
   a static piston,
   a movable cylinder in which said piston is slidably received, said cylinder having a chamber portion, a fluid inlet and a fluid outlet, said chamber portion communicating with said fluid inlet and said fluid outlet, said cylinder extending longitudinally from each side of said piston so that the longitudinal extension of said cylinder on a first side of said piston defines an end portion which projects from said body to enable a displacement force to be applied to said cylinder to provide a pumping action, and so that the longitudinal extension of said cylinder on a second side of said piston defines said chamber portion,
   a first non-return valve which provides an inlet to said cylinder,
   a second non-return valve which provides an outlet from said cylinder, and
   biasing means located in said cylinder for providing a biasing action to return said cylinder to a starting position,
   whereby said chamber portion receives fluid from said fluid inlet; fluid pressure is created in said chamber portion due to said pumping action so that fluid can escape from said fluid outlet and so that said cylinder is urged away from said piston on said second side of said piston; and said cylinder is urged, by said biasing means, away from said piston on said first side of said piston, said biasing action being less than a predetermined value of said fluid pressure, to prevent said cylinder returning to its starting position when said predetermined values are exceeded, so that said cylinder is retained in at least a partially displaced position with its longitudinal extension on said first side of said piston being spaced from the displacement force over part of the normal stroke of said cylinder.

2. A pump according to claim 1 wherein said piston is anchored to said body by a retaining member, said retaining member passing through slots in said cylinder and being fixed to said body.

3. A pump according to claim 2 wherein said first and second non-return valves are supported as an assembly by said cylinder.

4. A pump according to claim 3 wherein said biasing means is a spring, said spring being located in the longitudinal extension of said cylinder on said first side of said piston so that one end of said spring abuts said piston and the other end of said spring abuts a remote end of said cylinder.

5. A pump according to claim 4 wherein said body is made of nylon to enable secure but slidable support of said cylinder therein.

6. A lubricating system comprising the pump according to claim 1 and further including tubular means connected to said second non-return valve, which tubular means are provided to supply lubricating fluid to one or more bearings or chains in a machine connected to the system, and restricting means having a predetermined fluidic resistance, said restricting means being provided to restrict the supply of the lubricating fluid to the respective bearings or chains.

7. A system according to claim 6 including a plurality of restricting means connected to respective bearings or chains, said restricting means being of a type selected from those having predetermined orifices and those which are selectively adjustable to ensure that lubricating fluid is supplied to the respective bearings or chains.

* * * * *